March 5, 1963  R. J. HENGSTEBECK  3,080,433
DRYING PROCESS
Filed June 17, 1960
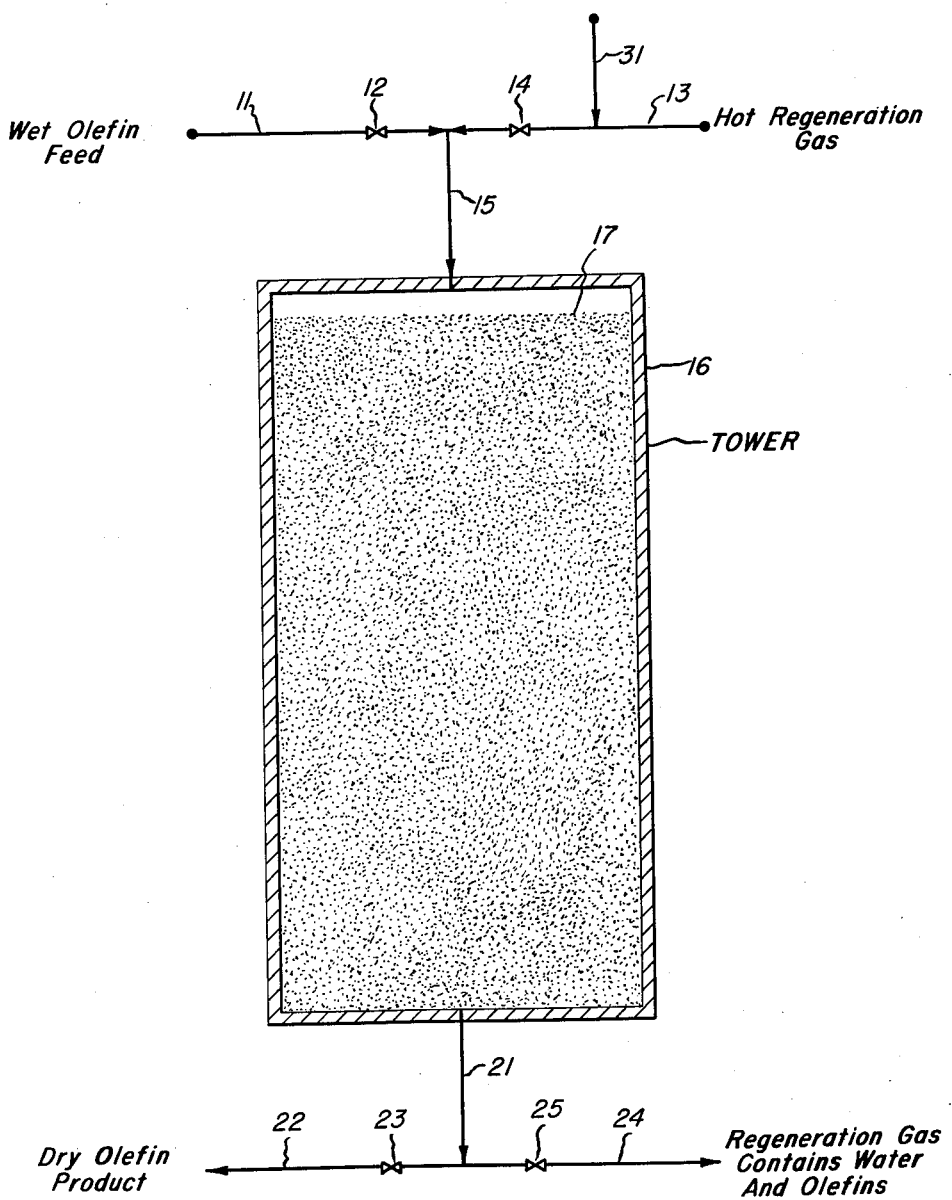
INVENTOR.
Robert J. Hengstebeck
BY
ATTORNEY 3,080,433
DRYING PROCESS
Robert J. Hengstebeck, Valparaiso, Ind., assignor to Standard Oil Company, Chicago, Ill., a corporation of Indiana
Filed June 17, 1960, Ser. No. 36,851
3 Claims. (Cl. 260—669)

This invention relates to treating a feed containing polymerizable unsaturated hydrocarbons for removal of water. More particularly, this invention relates to the regeneration of a solid adsorbent after adsorption of water and polymerizable unsaturated hydrocarbons thereon from such a feed.

It is well known that solid adsorbents are useful in removing water from hydrocarbon streams. The hydrocarbon stream is passed through the solid absorbent and the water is adsorbed. The adsorbent materials generally used are such solid adsorbents as silica gel, activated carbon, alumina gel, natural zeolites, synthetic zeolites, etc. After adsorption of the water on the solid adsorbent, such as when the adsorption capacity has been reached, it is necessary to regenerate the solid adsorbent so that it may be reused for additional water adsorption. It has been found that solid adsorbents may be regenerated by passing hot regeneration gases through a bed of adsorbent material in the opposite direction of flow from the normal direction of feed flow through the bed.

However, such regeneration with hot regeneration gases may cause rapid temperature increases to temperatures as high as 1000° F. or higher due to polymerization of polymerizable unsaturated hydrocarbons adsorbed on the bed. The rising temperature and polymerization apparently are caused by contacting such polymerizable hydrocarbons with the hot regeneration gas in the presence of the adsorbent material of the bed. The polymerization causes formation of large molecules on the adsorbent surface and decreases the efficiency of the adsorbent material. Often, ruinous polymer caking may form on the adsorbent material surfaces. The polymerization products may be decomposed by the high temperatures present leaving carbonaceous deposits which are not removed during normal regeneration of the bed and which result in destruction of at least a portion of the bed.

Loss of adsorbent material through polymerization is especially serious where the adsorbent is of the molecular sieve type. The molecular sieve adsorbents depend on pore openings of particular sizes to expose the greatest adsorptive surface to the hydrocarbon feed. Even dimerization or trimerization of olefins within the pores can produce a polymer which is trapped within the pore because of its molecular size. Such polymers obstruct adsorption surface of the sieve and decrease the capacity of the sieve for adsorbing water. The low molecular weight polymers may also decompose on heating and create carbonaceous deposits which cannot be removed. Further, the molecular sieve may be readily destroyed by the high temperatures resulting from polymerization upon contact with hot regeneration gases.

I have now discovered that when regenerating adsorbents after use for removal of water from a feed containing polymerizable unsaturated hydrocarbons, substantial polymerization of the olefins on the adsorbent and resulting rapid temperature increase and polymer caking can be avoided. In accordance with this invention, I have provided a regeneration method which comprises passing the regeneration fluid through the adsorbent material in the same direction of flow as the feed material. The regeneration method is particularly effective in regenerating molecular sieve adsorbents wherein, heretofore, it was believed that it was necessary to regenerate the sieve by flowing hot regeneration gases countercurrent to the normal flow of feed through the sieve. The regeneration method of this invention is conveniently capable of combination with a hydrocarbon drying step so that the combination process comprises flowing a feed containing polymerizable unsaturated hydrocarbons and water through an adsorbent bed whereby the water is selectively adsorbed and then passing regeneration fluid through the adsorbent bed in the same direction as and subsequent to the passing of the feed stream through the adsorbent material.

Although I do not wish to be limited to any theories with regard to the operation of this invention, it is believed that because the water is more strongly adsorbed on the adsorbent material than are the polymerizable unsaturated hydrocarbons, the residual polymerizable hydrocarbons at the end of the adsorption period would be at the outlet end of the adsorption bed. When the hot regeneration gases are charged to the outlet end of the bed, they come into direct contact with polymerizable hydrocarbons at the outlet end during normal regeneration procedures. However, in accordance herewith, the hot regeneration gases are charged to the inlet end of the bed and come into contact with the adsorbed water; the hot gases desorb the water which is moved down the bed and which in turn desorbs the polymerizable hydrocarbons at the outlet end of the bed. Thus, the polymerizable hydrocarbons are desorbed and driven from the bed before hot regeneration gases are permitted to contact them. This theory is apparently particularly applicable where the adsorbent material is of the molecular sieve type. In regeneration of a molecular sieve with hot gases, a temperature front passes through the bed and in the operation of this invention the temperature front would desorb water which would travel down the bed in front of the temperature front and would desorb the polymerizable hydrocarbons before the temperature front came into contact with them.

As an additional advantageous embodiment of this invention, both the feed flow and the regeneration gas flow can be reversed in a particular bed of the adsorbent material after each adsorption-regeneration cycle. Thus, any advantage that might accrue from reversal of flow after regeneration would be retained. A principal advantage of reversal of flow is the insuring that the outlet end of the bed in a subsequent adsorption process period, i.e., the inlet end of the bed from the prior regeneration process, would be completely regenerated.

The FIGURE represents a schematic flow for use in an embodiment of this invention. With reference to the FIGURE for better understanding of this invention, an example of the adsorption of water from a hydrocarbon feed and desorption of the adsorbent material is herein given. A butylene-butane stream containing about 32% butylene and about 400 p.p.m. water is charged to line 11 to be dried for use as a feed to sulfuric acid catalyzed alkylation; even such small amounts of water as 400 p.p.m. may adversely affect the action of the catalyst of the alkylation process and the feed, therefore, must be dried. Valve 12 is opened while valve 14 is maintained in closed position and the feed is charged through line 15 to tower 16 which is packed with Linde 5A molecular sieve, i.e., molecular sieve 17. The feed is charged to tower 16 until water is indicated as breakthrough in line 21. Dry butylene-butane product is removed through line 21, valve 23 and line 22 while feed is being charged through line 11. During charging of feed, the feed temperature and temperature of molecular sieve 17 within tower 16 is maintained at about 100° F. The dry butylene-butane product contains only from about 5 to about 10 p.p.m. water.

Valve 25 is closed. After breakthrough of the water in line 21, valves 12 and 23 are closed and valves 14 and 25 are opened. Hot nitrogen gas is charged at about 400° F. through line 13, valve 14 and line 15 to tower 16, butylene and water are removed substantially in order with the nitrogen gas through line 21, line 24 and valve 25. If desired, butylene, which is taken off first through line 21, may be combined with the dry butylene-butane product; butane may also be present in the butylene from line 21.

Molecular sieve 17 in tower 16 is now regenerated and may be used for further removal of water from additional feed material. As indicated above, tower 16 may be reversed to take advantage of the greater regeneration at the inlet end during the above regeneration procedure. Alternatively, the indicated arrows of flow may be reversed for a subsequent adsorption and desorption procedure charging the feed to line 22 during adsorption while removing dry product from line 11. During regeneration, it follows, hot nitrogen gas is charged to line 24 and butylene, water and nitrogen gas are removed through line 13.

It is not necessary to charge feed to the bed until its adsorptive capacity for water has been reached. However, in order to prevent polymerization of the polymerizable hydrocarbons on the bed, it is necessary to have sufficient water present within the bed to form a barrier between the hot regeneration gas and the polymerizable hydrocarbons on the bed. Thus, where only very small amounts of water are removed from a feed, i.e. amounts insufficient to prevent polymerization, it is advantageous to add water to the first surge of hot regeneration gas charged to the bed during regeneration. With reference again to the figure, steam is added to line 13 through line 31 and is carried by the first surge of regeneration gas into tower 16.

The feeds which may be dried by contact with the bed of adsorbent material are well known in the art. The feed is one which contains a polymerizable unsaturated hydrocarbon, such as a feed derived from petroleum oils, e.g., a hydrocarbon feed. The polymerizable unsaturated hydrocarbon is one which is readily polymerizable in the presence of the adsorbent material by contact with a hot regeneration gas. The polymerizable hydrocarbon may be such that polymerization thereof is initiated by an increase in temperature due to the regeneration gas and/or may be such as to be catalyzed by the adsorbent material. Thus, the polymerizable hydrocarbon tends to form a polymer on the adsorbent material during regeneration of the adsorbent material. Regeneration in accordance with this invention is especially advantageous where the polymerizable hydrocarbon is present in an amount of at least 5% in the adsorption feed although even amounts as low as about 1% may cause some problems due to polymerization. The polymerizable unsaturated hydrocarbon may advantageously be a mixture of saturated and unsaturated aliphatic hydrocarbons containing, for example, olefins and diolefins. Preferably, the feed to the adsorption step predominates in homopolymerizable unsaturated hydrocarbons such as ethylene, propylene, butylene, acetylene, pentadiene, styrene, dodecylene, or the like.

Where the adsorbent material is used in the adsorption bed has an affinity for nonpolymerizable aromatic hydrocarbons in preference to the polymerizable unsaturated hydrocarbons, a feed containing substantial amounts of such nonpolymerizable aromatic hydrocarbons, i.e., sufficient to preclude adsorption of the polymerizable hydrocarbon on the adsorbent material, then no problem of polymerization on the adsorbent material is encountered and regeneration in accordance herewith need not be used. However, in the preferred embodiment where the adsorbent material is a molecular sieve which selectively adsorbs straight-chain hydrocarbons in preference to aromatic hydrocarbons, and where straight-chain polymerizable unsaturated hydrocarbons are adsorbed in the pores during drying of the feed on the molecular sieve, it is immaterial that aromatic hydrocarbons may be present even in substantial amounts; the problem of polymerization still occurs due to preferential adsorption of the straight-chain polymerizable hydrocarbons. Thus, in the preferred embodiment employing a molecular sieve, the regeneration procedure of this invention is particularly advantageous in preventing polymerization of hydrocarbons adsorbed within the pores of the sieve.

The adsorbent materials are any solid adsorbent materials upon which water is more strongly adsorbed than the polymerizable hydrocarbon of the wet feed. Such adsorbent materials include silica gel, activated carbon, alumina gel, bauxite, synthetic zeolites and natural zeolites. The preferred adsorbent materials are the molecular sieve materials. Molecular sieve materials are usually comprised of sodium, calcium, aluminum, silicon and oxygen, and possess a definite crystalline structure providing a large number of cavities communicating with the outer crystal surface by way of small pores or openings. The molecular sieve may be a naturally occurring zeolite or a synthetic zeolite having rigid 3-dimensional anionic networks. Specific examples of sieve materials are chabazite, phacolite, harmotome, gmelinite, etc. Particularly desirable molecular sieve materials are those synthetic molecular sieves such as Linde Molecular Sieve Type 5A because of their uniform crystal structure and pore sizes. Such synthetic molecular sieves are available commercially having pore sizes from 4 angstroms up to about 13 angstroms, such as those marketed by Linde Company, Div. of Union Carbide Corp.

The adsorbent materials selectively adsorb water in preference to other materials in the adsorption feed during drying of the feed. Water may be present in amounts of from a few p.p.m., e.g. about 20 p.p.m., up to 1% or more. The molecular sieve materials are particularly useful in removing water in amounts of from a few p.p.m. up to 0.1% and, after drying with a molecular sieve material the water content of the feed material may usually be reduced to from 5 to 10 p.p.m. or lower, even below the concentration necessary for detection of water.

The adsorption of water on the adsorbent material may conveniently be carried out at any temperature desired even up to about 600° F. The lower end of the temperature range is defined by the temperature necessary to maintain the feed in the liquid state. Adsorption is carried out in either liquid or vapor phase, but preferably in liquid phase. Also, it is preferred to carry out the adsorption at the lowest temperature convenient, e.g., ambient temperatures. The adsorption conditions are known to the art.

Regeneration is carried out by contacting the adsorbent material after adsorption with a hot regeneration fluid, preferably a hot regeneration gas. During regeneration, the effluent from the adsorbent bed may be conveniently maintained at atmospheric temperature while the inlet is maintained at a pressure sufficiently high to provide adequate flow of regeneration fluid through the bed, e.g., at about 15 p.s.i.g. The regeneration may be conducted under pressure if desired and such pressures, where used, may range from zero to several hundred p.s.i.g. Of course, pressure drop across the bed may be maintained by evacuation at the outlet during regeneration. It is preferred to regenerate at high temperatures, e.g., 400° F. to 600° F., to increase the rate of regeneration of the bed.

The regeneration fluid may be any regeneration gas or liquid normally used to regenerate a bed of adsorbent material. Such gases are known in the art. For best results, the regeneration gases may be dried prior to use. Examples of regeneration gases are butane gas, propane gas, liquid petroleum gas, hydrogen, nitrogen, unsaturate-free fuel gas, or the like. As liquid regeneration fluids, the normal saturated hydrocarbons such as n-octane may be especially useful. It is preferred that the regeneration fluid be readily separable from the polymerizable unsaturated hydrocarbon of the feed such as by distillation, e.g., the regeneration fluid may boil in a range differing from the boiling range of the polymerizable unsaturated hydrocarbon.

It is evident from the foregoing that I have provided an improved process for regenerating beds of adsorbent materials and especially molecular sieve beds after use of such beds for drying feed materials containing unsaturated polymerizable hydrocarbons.

I claim:
1. A process for removing contaminating amounts of water from a hydrocarbon feed material containing polymerizable unsaturated hydrocarbon and said contaminating water which process comprises charging said feed material to an inlet end of an adsorbent bed consisting essentially of molecular sieve particles, passing said feed material through said bed whereby contaminating water and polymerizable unsaturated hydrocarbons are adsorbed on said bed, withdrawing an effluent from an outlet end of said bed, said effluent consisting essentially of feed material decreased in polymerizable unsaturated hydrocarbon content and substantially free of water contaminants, regenerating said adsorbent bed by charging an amount of water to said inlet end sufficient to provide a barrier protecting adsorbed polymerizable unsaturated hydrocarbon from direct contact with following hot regeneration gas, charging hot regeneration gas to said inlet, passing said regeneration gas through said bed and withdrawing adsorbed polymerizable unsaturated hydrocarbon, and water substantially in that order from said outlet whereby said bed is regenerated.

2. A process for removing water contaminants from a hydrocarbon feed material containing polymerizable unsaturated hydrocarbons and said contaminants, which process comprises adsorbing said water from said feed material on a bed of molecular sieve adsorbent by passing said feed material through said bed from an inlet end to an outlet end of said bed whereby water and polymerizable unsaturated hydrocarbons are adsorbed on said bed and a dry hydrocarbon product is obtained at said outlet, charging an amount of water to said inlet sufficient to provide a barrier capable of protecting adsorbed polymerizable unsaturated hydrocarbon from direct contact with hot regeneration gas at said inlet, and passing hot regeneration gas through said bed from said inlet to said outlet whereby the added water and said adsorbed water are forced through said bed by said hot regeneration gas and thereby displace said adsorbed polymerizable unsaturated hydrocarbon from the adsorbent material of said bed before said hot regeneration gas is permitted to contact said adsorbed polymerizable unsaturated hydrocarbon, and whereby adsorbed polymerizable unsaturated hydrocarbon, and water are removed from said bed at said outlet in substantially that order.

3. A process for treating a hydrocarbon feed material containing polymerizable unsaturated hydrocarbons and water with a bed of molecular sieve material adapted for flow therethrough in two opposite directions, which process comprises passing a portion of said feed material through said bed in a first direction whereby water and polymerizable unsaturated hydrocarbons are adsorbed, passing hot regeneration gas through said bed in said first direction of flow until said bed is substantially purged of water, preceding the hot regeneration gas passing in said first direction of flow with an amount of water sufficient to provide a water barrier between hot regeneration gas and unregenerated adsorbent, passing a second portion of said feed through the resulting regenerated bed in a second direction of flow opposite to said first direction whereby water and polymerizable unsaturated hydrocarbons are adsorbed, passing hot regeneration gas through said bed in said second direction of flow until said bed is again substantially purged of water, and again preceding the hot regeneration gas passing in said second direction of flow with an amount of water sufficient to provide a water barrier between hot regeneration gas and unregenerated adsorbent, whereby the resulting regenerated bed is capable of adsorbing water from additional said feed material.

References Cited in the file of this patent
UNITED STATES PATENTS

| | | |
|---|---|---|
| 2,273,350 | Fry et al. | Feb. 17, 1942 |
| 2,323,524 | Downs | July 6, 1943 |
| 2,356,890 | Schulze | Aug. 29, 1944 |
| 2,440,784 | Perdew | May 4, 1948 |
| 2,910,139 | Matyear | Oct. 27, 1959 |

OTHER REFERENCES

Linde Company, "Dry Gas?" publication F-1026 of the Linde Department, Union Carbide Corporation, 30 East 42nd St., New York 17, N.Y., pp. 10–12, January 6, 1958.